United States Patent [19]

Yamakawa

[11] Patent Number: 5,204,752
[45] Date of Patent: Apr. 20, 1993

[54] IMAGE PROCESSING APPARATUS HAVING SHADOW COMPOSITION CAPABILITY USING BINARY DATA THINNING AND THICKENING CIRCUITS AND PRESET THINNING AND THICKENING WIDTH DATA

[75] Inventor: Shinji Yamakawa, Kawasaki, Japan
[73] Assignee: Ricoh Company, Ltd., Tokyo, Japan
[21] Appl. No.: 856,722
[22] Filed: Mar. 24, 1992

[30] Foreign Application Priority Data

Mar. 25, 1991 [JP] Japan .................................. 3-082905

[51] Int. Cl.⁵ ........................ H04N 1/23; H04N 1/387
[52] U.S. Cl. ..................................... 358/296; 358/447; 358/455; 382/55
[58] Field of Search ............... 358/296, 447, 448, 450, 358/451, 452, 453, 455, 461, 462, 428; 382/54, 55; 395/126

[56] References Cited

U.S. PATENT DOCUMENTS

4,010,446 3/1977 Kawa ..................................... 382/55
4,707,715 11/1987 Miura ................................... 358/296
5,083,217 1/1992 Kumamoto .......................... 358/452

Primary Examiner—Benjamin R. Fuller
Assistant Examiner—Scott A. Rogers
Attorney, Agent, or Firm—Mason, Fenwick & Lawrence

[57] ABSTRACT

An image processing apparatus includes a control part for allowing real-time operations of a scanning unit and a recording unit, a binarizing part for generating signals indicative of binary data from input data, a preset data generating part for generating either a preset thinning width or a preset thickening width, a thinning circuit for carrying out a choking process in which the binary data is moved either in a main scanning direction or in a sub scanning direction and a portion of an original image is removed so as to obtain a choked image, a thickening circuit for carrying out a spreading process in which the binary data is moved either in the main scanning direction or in the sub scanning direction and an additional image portion is added to the original image so as to obtain a spread image, and an image composition part for generating a composite image of the choked image and the spread image so that a shadow is added to the original image.

9 Claims, 13 Drawing Sheets

↓ SUB SCAN THINNING

↓ MAIN SCAN THINNING

SUB SCAN THICKENING

MAIN SCAN THICKENING

SHADOW

↓ SUB SCAN THICKENING

↓ MAIN SCAN THICKENING

SUB SCAN THINNING

MAIN SCAN THINNING

SHADOW

|  | PRIOR ART | PRESENT INVENTION |  |
|---|---|---|---|
| WIDTH (THICKEN/THIN) | n | $2^n - 1$ |  |
| WIDTH (DISPLACEMENT) | n | $2^{\frac{n}{2}} - 1$ | THICKENING + THINNING |

IMAGE PROCESSING APPARATUS HAVING SHADOW COMPOSITION CAPABILITY USING BINARY DATA THINNING AND THICKENING CIRCUITS AND PRESET THINNING AND THICKENING WIDTH DATA

BACKGROUND OF THE INVENTION

The present invention relates generally to an image processing apparatus, and more particularly to an image processing apparatus for carrying out a shadow process to automatically add a shadow to an image, which apparatus is applicable to a digital copier, a printer or the like.

Figure 2A:
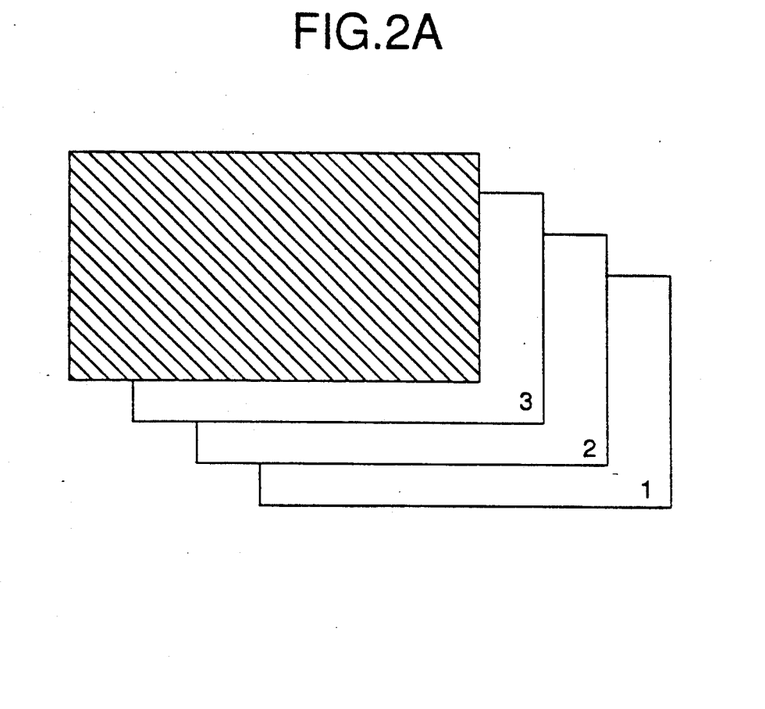
FIGS. 2A and 2B are diagrams for explaining a shadow process performed by the conventional image processing apparatus for adding a shadow to an output image.
Figure 2B:
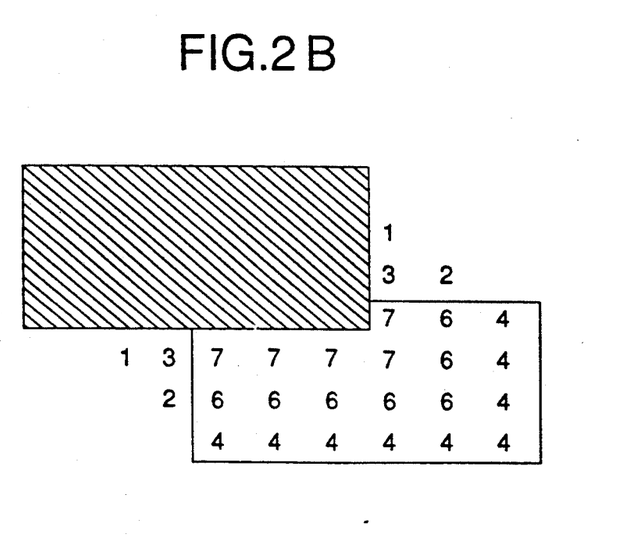

In an image processing system, several image decorating functions are used. For example, a shadow process is one of such functions, and the shadow process is carried out so that a composite image of the original image with its shadow is output. FIGS. 2A and 2B show two typical shadow processes, one being called a solid shadow process and the other being called a plane shadow process. In FIG. 2A, the solid shadow process is carried out, and the original image is accompanied by three transitive images as the shadow images. A composite image of the original image and the shadow images is formed, so that it looks as if the original image was moved to the right diagonally downward with the traces of the image movement remaining there. In FIG. 2B, a plane shadow process is carried out, and a shadow image is formed at a desired position to which the image is moved to the right diagonally downward by a displacement (=3) equivalent to the movement of the image in the solid shadow process and a shadow is cast from the original image onto the position. A composite image of the original image and the shadow with shadow portions being cast onto the position of the shadow is formed in the plane shadow process.

Figure 1:
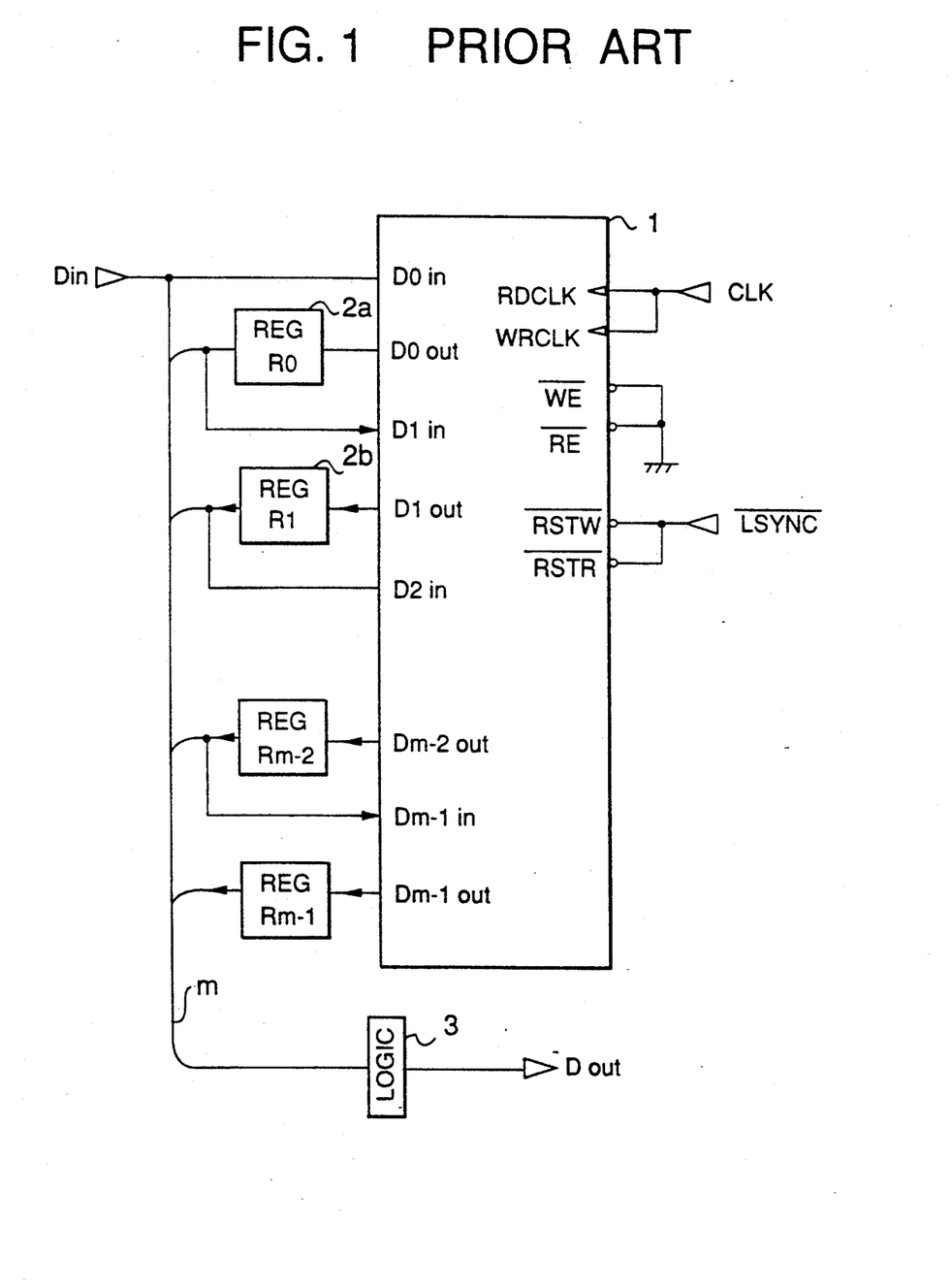
FIG. 1 is a diagram showing a line memory of a conventional image processing apparatus.

Conventionally, such movement of the image in the shadow process is carried out by moving binary data by means of a thickening or spreading circuit for carrying out a spreading process and a thinning or choking circuit for carrying out a choking process. FIG. 1 shows a line memory used in each of such circuits. This line memory 1 has data input ports D0in through Dm-1in and data output ports D0out through Dm-1out. Control signals input to the line memory 1 are a pixel clock CLK, a read clock RDCLK, a write clock WRCLK, a write enable signal WE, a read enable signal RE, a line sync signal LSYNC, a reset write signal RSTW, and a reset read signal RSTR. It is required that the line memory has a large storage capacity and a high-speed data access.

In FIG. 1, reference numerals 2a and 2b denote registers (D flip-flop) R0 and R1 coupled to the line memory 1 via the data input ports and the data output ports. Similarly, registers R2 through Rm-1 are coupled to the line memory 1 via the data input and output ports. Reference numeral 3 denotes a logic element serving as a selector for selecting a line from a set of lines ("m": the number of lines).

Input data Din is supplied to the line memory 1 via the data input port D0in. The data output port D0out of the line memory 1 is connected to the input of the register R0, and the output of the register R0 is connected to the data input port D1in and connected to the logic element 3 for transferring the data from the port D0in to the port D1in (or the logic element 3). This data transfer procedure is repeatedly carried out with respect to the data input ports D1in through Dm-1in so that the image is moved to an arbitrary position to the right diagonally downward by a displacement corresponding to the selected number "m−1" of the lines. By selecting a line from the number "m" of the lines by means of the logic element 3, it is possible to move the image to a arbitrary position to the right diagonally downward.

In a conventional image processing apparatus, such as a digital copier, which performs real-time operations with no frame memory, a shadow outlining process is carried out by storing several lines of image data in several line memories. When the plane shadow process is carried out, an arbitrary line of the image data from the line memories is selected for shadow image data in the plane shadow process. However, there is a problem in that if the above mentioned shadow process is carried out a shadow may be added to an image of undesired matter such as dust or stain in the original image. Thus, it is necessary to remove the undesired matter such as dust or stain from the original document before a shadow process is carried out.

SUMMARY OF THE INVENTION

Accordingly, it is a general object of the present invention to provide an improved image processing apparatus in which the above described problems are eliminated.

Another and more specific object of the present invention is to provide an image processing apparatus in which a smaller storage space of the line memory is used by writing only necessary data to the line memory during the shadow process, rather than storing several lines of image data in several memories.

Still another object of the present invention is to provide an image processing apparatus in which a shadow is added to an image of relatively great character or logotype by carrying out a plane shadow process or a shadow outlining process, thus preventing the shadow from being added to an undesired image of small matter such as dust or stain in the original image. The above mentioned objects of the present invention can be achieved by an image processing apparatus which includes a control part for allowing real-time operations of a scanning unit and a recording unit, a binarizing part for generating signals indicative of binary data from the image data supplied by the scanning unit, a preset data generating part for generating either a preset thinning width or a preset thickening width, a thinning circuit for carrying out a thinning (choking) process in which the binary data supplied by the binarizing part is moved either in a main scanning direction or in a sub scanning direction and a portion of an original image is removed so as to obtain a choked image, a thickening circuit for carrying out a thickening (spreading) process in which the supplied binary data is moved either in the main scanning direction or in the sub scanning direction and an additional image portion is added to the original image so as to obtain a spread image, and an image composition part for generating a composite image of the choked image supplied by the thinning circuit and the spread image supplied by the thickening circuit so that a shadow is added to the original image. According to the present invention, it is possible to efficiently use the line memory when carrying out a plane shadow process or a shadow outlining process. By means of the thinning part and the thickening part in the image processing unit of the present invention, a plane shadow process and a shadow outlining process can be carried out by writing only necessary data to the line memory, rather than storing several lines of image data in the line memories during the shadow process. Also, according to the present invention, it is possible to add a shadow to an image of relatively great character or logotype only, with no need for removing undesired matter such as dust o stain from the original image prior to the shadow process.

Other objects and further features of the present invention will become more apparent from the following detailed description when read in conjunction with the accompanying drawings.

DESCRIPTION OF THE PREFERRED EMBODIMENTS

Figure 3:
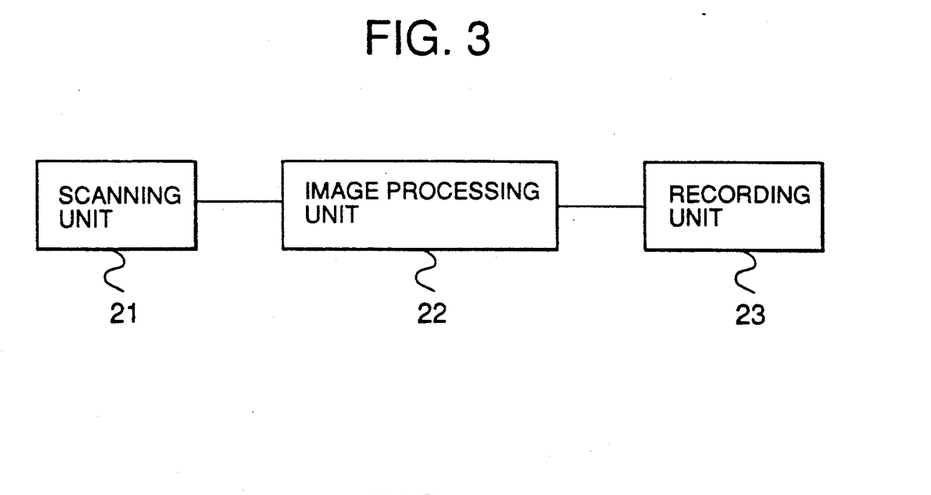
FIG. 3 is a block diagram showing an image processing apparatus to which the present invention is applied.

A description will now be given of an image processing apparatus according to the present invention. FIG. 3 shows an image processing apparatus to which the present invention is applied. In FIG. 3, this image processing apparatus includes a scanning unit 21 for reading out an image data (digital data) from a document by scanning the document, an image processing unit 22 for carrying out a prescribed image processing for the image data supplied by the scanning unit 21, and a recording unit 23 for outputting the image data supplied by the image processing unit 22 for recording it on a copy sheet.

Figure 4:
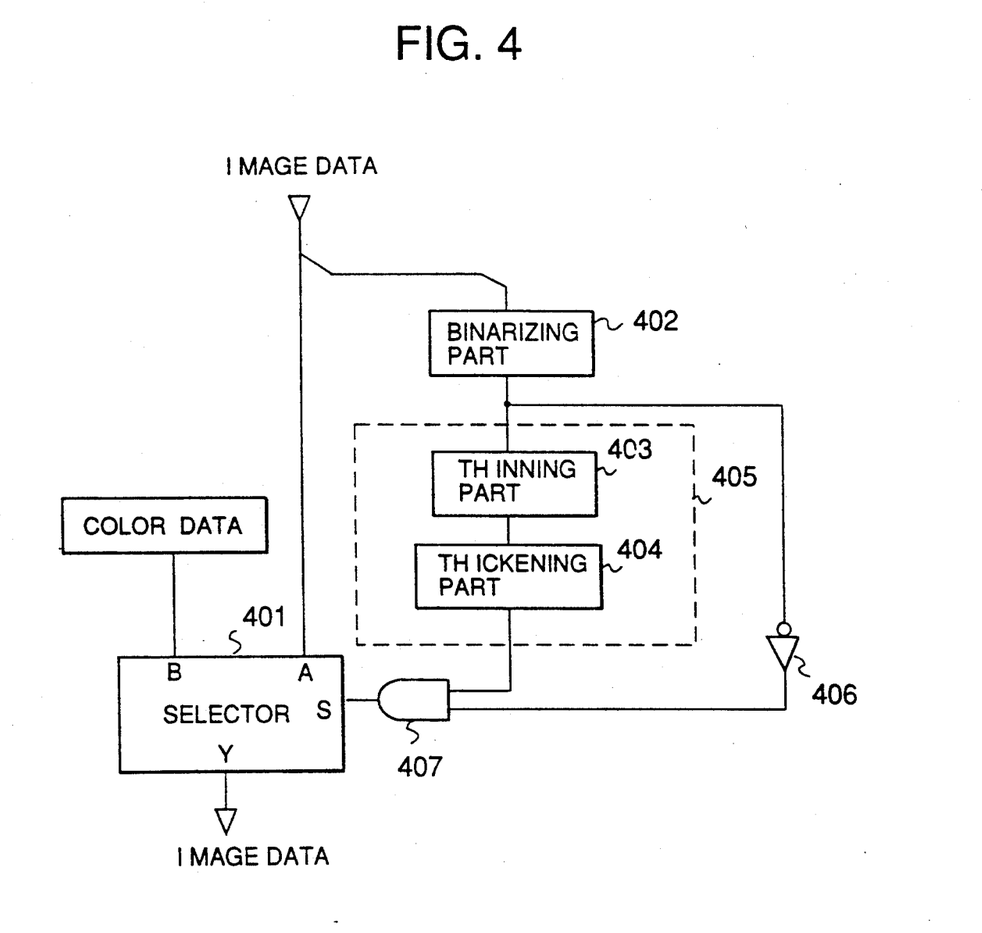
FIG. 4 is a diagram showing an embodiment of an image processing apparatus of the present invention.

FIG. 4 shows an embodiment of the image processing apparatus of the present invention. In FIG. 4, an image signal indicating image data is input to a port A of a selector 401, and is also input to a binarizing part 402. A binary signal supplied by the binarizing part 402 is input to an image processing circuit 405 including a thinning part 403 for carrying out a choking process for a supplied image and a thickening part 404 for carrying out a supplied image, and is also input to an inverter 406. An image signal supplied by the image processing circuit 405 is input to an input port of an AND circuit 407, and an image signal supplied by the inverter 406 is input to the other input part of the AND circuit 407. An image signal supplied by the AND circuit 407 is input to a port S of the selector 401. A signal indicating color data is input to a port B of the selector 401.

Figure 6:
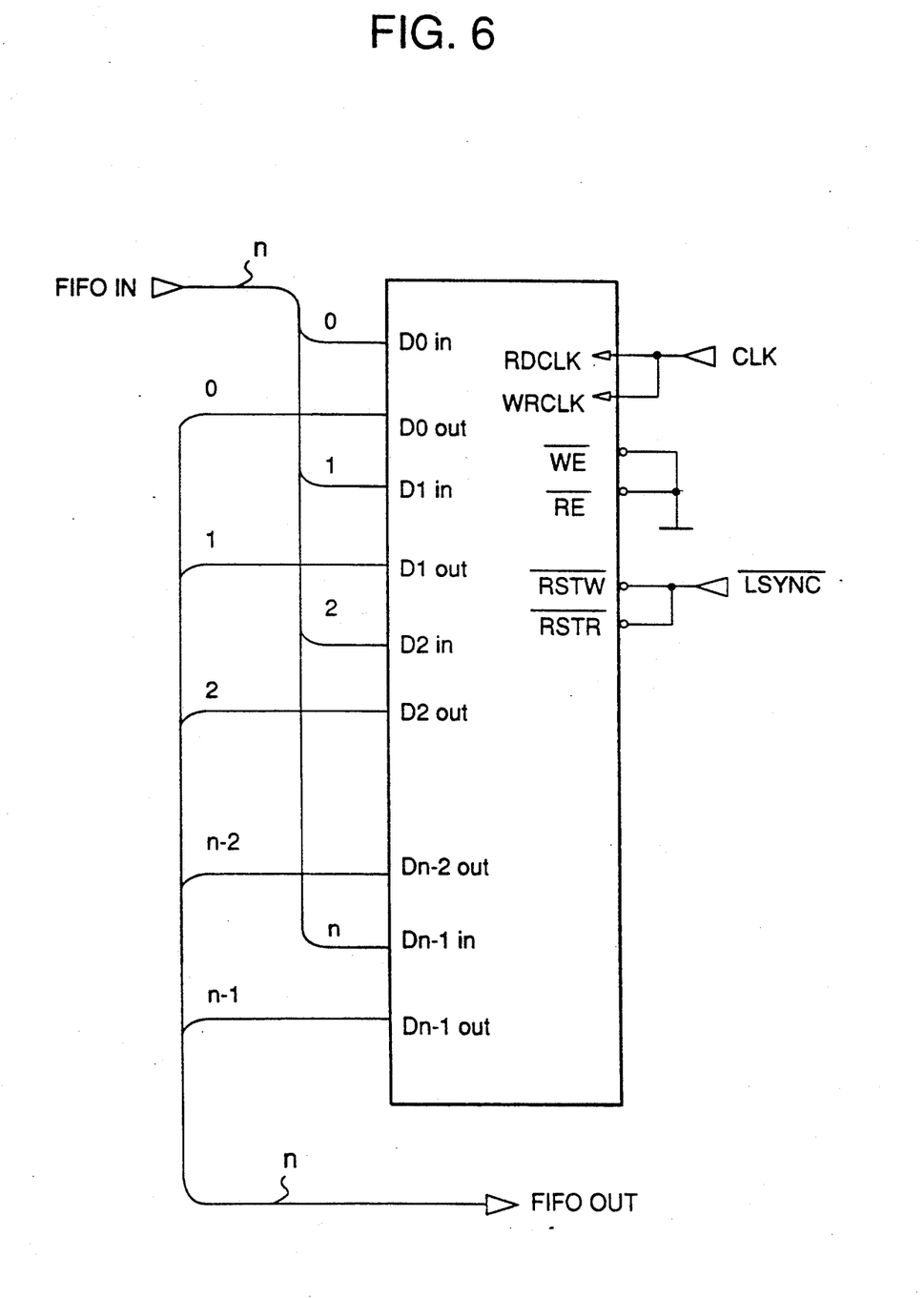
FIG. 6 is a diagram showing a line memory used in the image processing apparatus of the invention.

FIG. 6 shows a construction of a line memory used in the image processing apparatus of the present invention. A memory device used as the line memory of the image processing units of the present invention is, for example, NEC uPD42505C, and this memory device has a FIFO memory structure and a storage capacity of 5048 words×8 bits.

Figure 5:
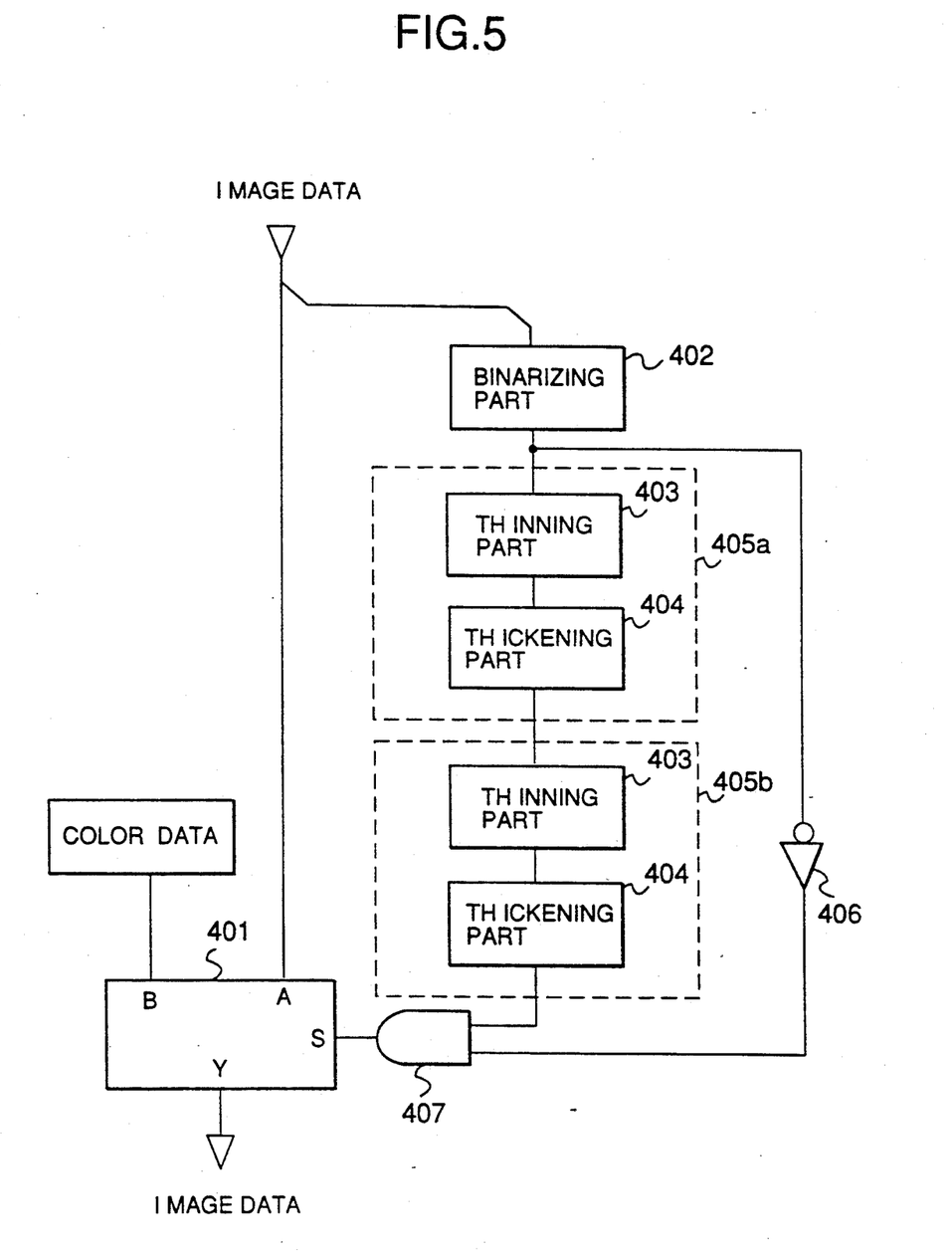
FIG. 5 is a diagram showing another embodiment of the present invention.

FIG. 5 shows a second embodiment of the present invention. In this embodiment, two image processing circuits 405a and 405b connected in series, each of which includes the thinning part 403 and the thickening part 404, are provided in the image processing apparatus so that a choking process and a spreading process are carried out repeatedly by the image processing circuits 405a and 405b.

Figure 7:
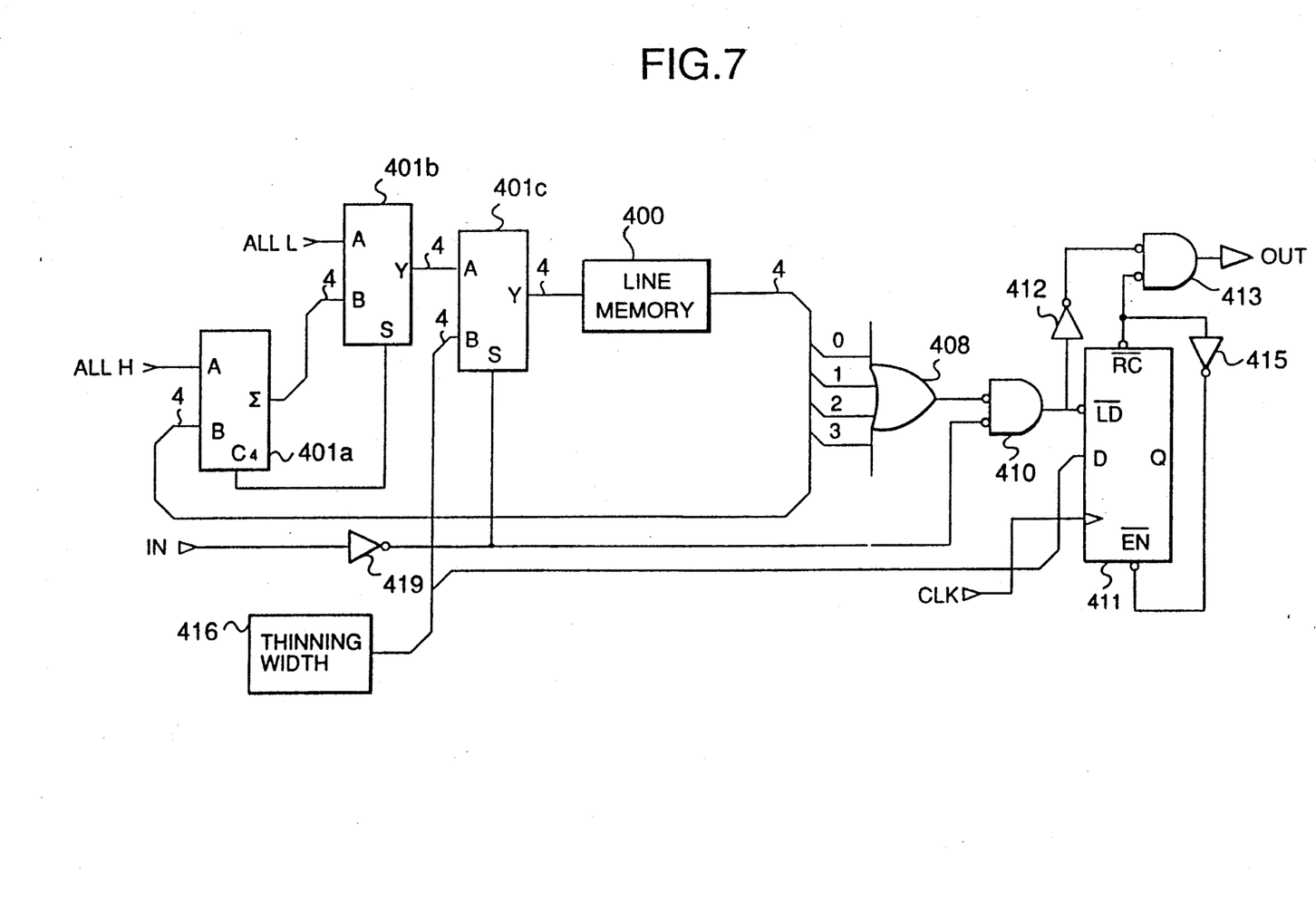
FIG. 7 is a circuit diagram showing a thinning part of an image processing circuit shown in FIGS. 4 and 5.
Figure 9A:
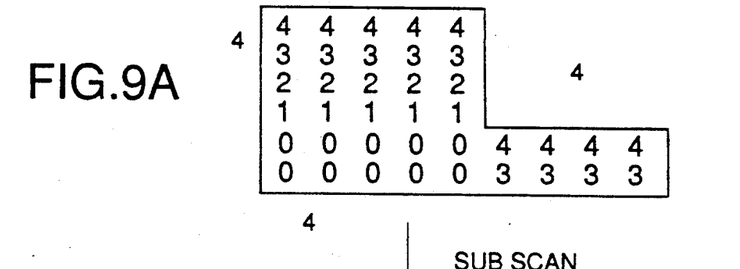
FIGS. 9A through 9C are diagrams for explaining a choking process performed by the thinning part of FIG. 7.
Figure 9B:
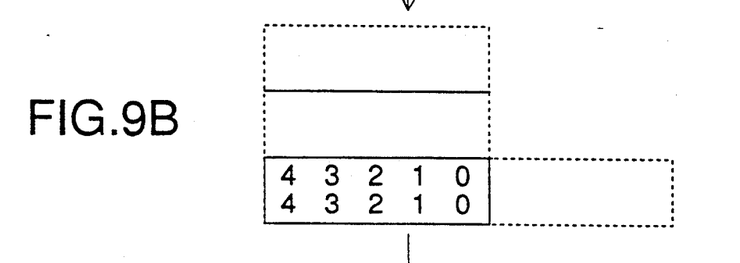
Figure 9C:
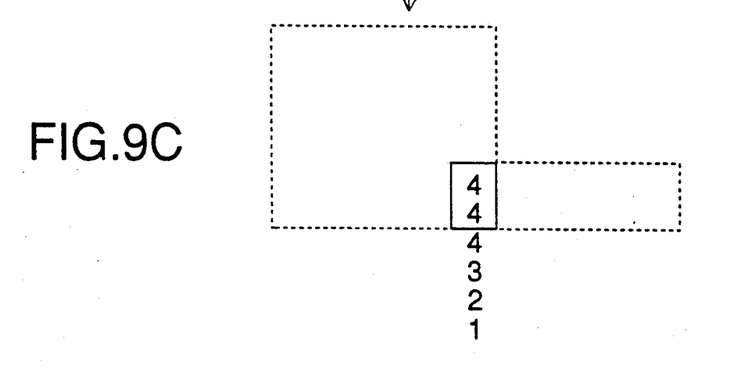

FIG. 7 shows the thinning part 403 used in the image processing circuit 405 shown in FIGS. 4 and 5. FIGS. 9A through 9C are diagrams for explaining a choking process performed by the thinning part 403 of FIG. 7. In FIG. 7, a selector 401a has an output port connected to a port B of a selector 401b, and this selector 401b has an output port connected to a port A of a selector 401c. The selector 401c has an output port connected to a line memory 400. An output signal of the line memory 400 is input to an NOR circuit 410 via an OR circuit 408. An input image signal indicating binary data of either "1" or "0" is input to an inverter 419, and the input image signal is converted by the inverter 419 into a signal indicating inverted data of either "0" or "1". Such an inverted signal by the inverter 419 is input to the NOR circuit 410 and also input to the selector 401c. An output signal of the NOR circuit 410 is input to a counter 411 and also input to an NOR circuit 413 via an inverter 412. A signal from a port RC of the counter 411 is input to the NOR circuit 413 and also input to a port EN of the counter 411 via an inverter 415. A preset data generator 416 supplies a signal indicating a preset thinning width to a port B of the selector 401c and this signal by the preset data generator 416 is also input to a port D of the counter 411.

For the sake of convenience, it is assumed, in the above described embodiment, that the thinning width data is preset to "4". If the thinning width data being set to "4" is supplied by the generator 416 to the selector 401c and to the counter 411 and the input signal indicating binary "0" is supplied to the selector 401c via the inverter 419, the selector 401c selects the thinning width "4" and this thinning width data is supplied to the line memory 400. In such a condition, a signal indicating binary "0" is output by the NOR circuit 410, and a signal indicating binary "0" is output by the inverter 413.

If the input signal indicating binary "1" is supplied to the selector 401c via the inverter 419, "1" is subtracted from a readout of the line memory 400 and a resulting data is written by the selector 401c to the line memory 400. Only when the readout of the line memory 400 is equal to zero, the resulting data is the same as the readout and "0" is written to the line memory 400. If the readout of the line memory 400 is equal to zero "0" and the input signal indicates binary "1", a signal indicating binary "1" is output by the NOR circuit 410. This operation by the thinning part 403 is called a sub-scan thinning process in which an output image is changed from a condition shown in FIG. 9A to a condition shown in FIG. 9B. As shown, the output image is choked along a sub-scanning line, or a width of the image in a sub-scanning direction is decreased (only an upper portion of the image is removed and the amount of reduction in the sub-scanning width is equal to 4).

When a signal indicating binary "0" is output by the NOR circuit 410, the counter 411 continues to load a signal indicating the thinning width "4", and a signal indicating binary "1" is output by the port RC of the counter 411 to the NOR circuit 413. In such a condition, a signal indicating binary "0" is output by the NOR circuit 413. On the other hand, when a signal indicating binary "1" is output by the NOR circuit 410, the counter 411 continuously performs a count-down operation until the signal at a port Q of the counter 411 indicates binary "0". Once the signal at the port Q of the counter 411 indicates binary "0", a signal output by the port RC of the counter 411 indicates binary "0", then the counter 411 stops the count-down operation. If the signal indicating binary "1" is output by the NOR circuit 410 and the signal indicating binary "0" is output by the port RC of the counter 411, a signal indicating binary "1" is output by the NOR circuit 413. This operation of the thinning part 403 is called a main-scan thinning process in which the output image is changed from the condition shown in FIG. 9B to a condition shown in FIG. 9C. As shown, the image is choked along a main-scanning line, or a width of the image in a main scanning direction is decreased (only a left-hand end portion of the image is removed).

Figure 8:
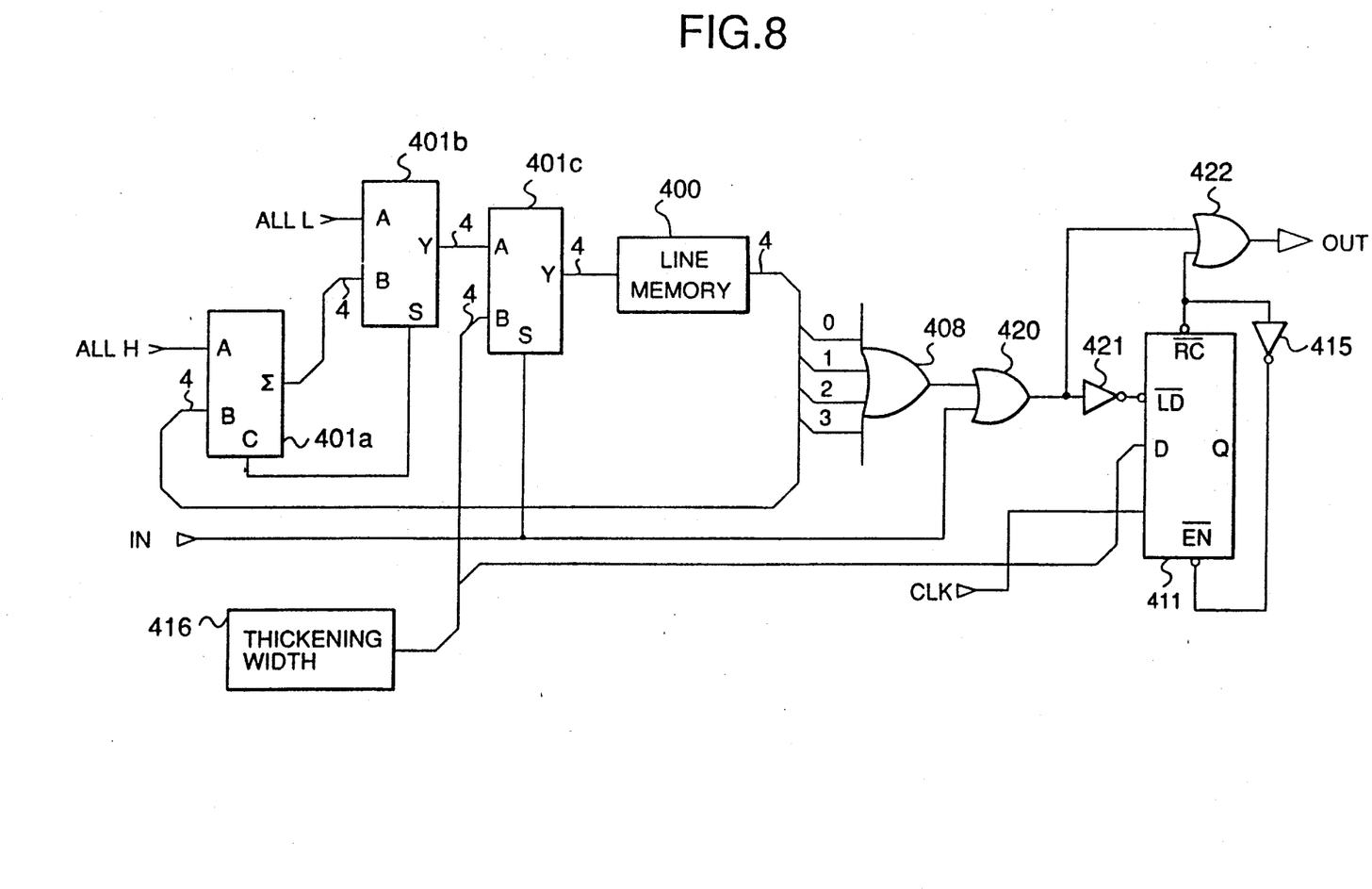
FIG. 8 is a circuit diagram showing a thickening part of the image processing circuit shown in FIGS. 4 and 5.
Figure 13:
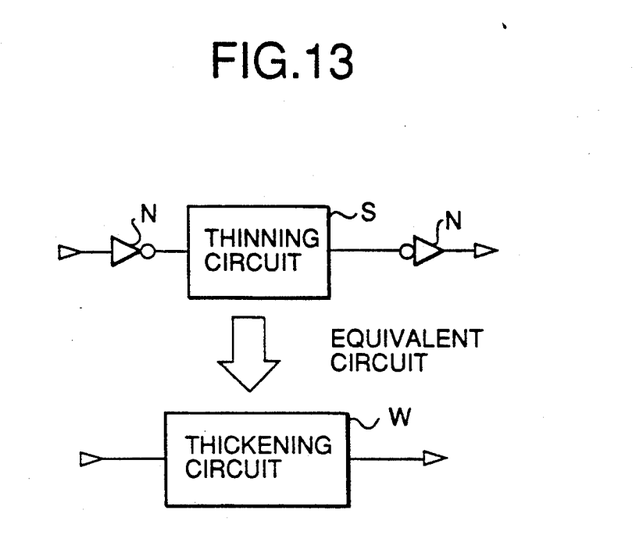
FIG. 13 is a diagram for explaining a relationship between a thinning circuit and a thickening circuit.

FIG. 8 shows the thickening part 404 used in the image processing circuit 405 shown in FIGS. 4 and 5. FIG. 13 is a diagram for explaining a relationship between a thinning circuit S and a thickening circuit W. As shown in FIG. 13, a circuitry in which an inverter N is connected to the input of the thinning circuit S and another inverter N is connected to the output of the thinning circuit S is equivalent to the thickening circuit W. In FIG. 8, the thickening part 404 is equivalent to a circuitry in which an inverter is connected to the input of the thinning part shown in FIG. 7 and an inverter is connected to the output of the thinning part. More specifically in the thickening part 404 shown in FIG. 8, the inverters 419 and 412 are removed from the thinning part 403 as in FIG. 7, OR circuits 420 and 422 are substituted for the NOR circuits 410 and 413, and an inverter 421 is placed between the OR circuit 420 and the counter 411. The preset data generator 416 supplies a signal indicating a preset thickening width to the selector 401c, and the signal is also supplied to the counter 411. In FIG. 8, the other parts than the above mentioned parts which are the same as those corresponding parts in FIG. 7 are designated by the same reference numerals, and a description thereof will be omitted.

Figure 10A:
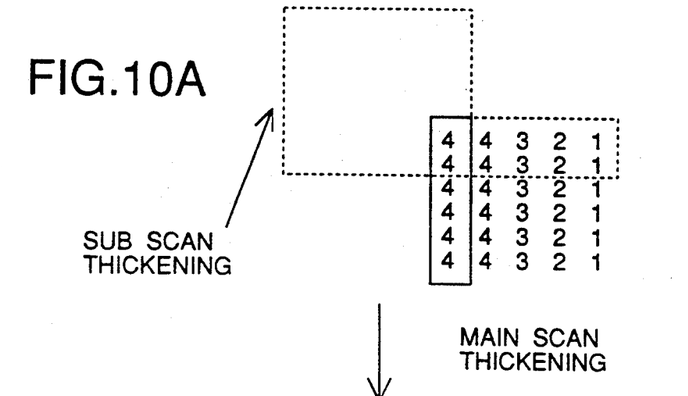
FIGS. 10A through 10C are diagrams for explaining a spreading process performed by the thickening part of FIG. 8 after the choking process is performed.
Figure 10B:
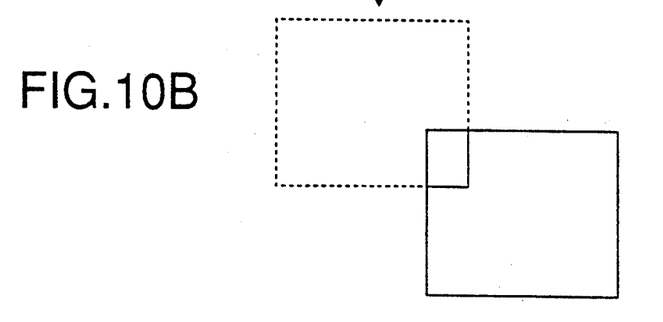
Figure 10C:
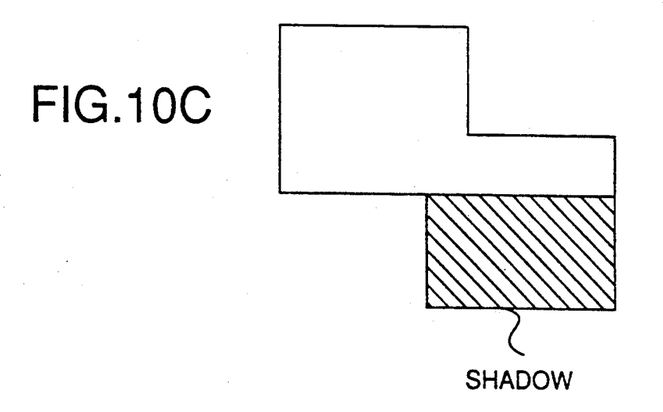

FIGS. 10A through 10C show a spreading process performed by the thickening part 404. Similarly to the above described thinning process, a sub-scan thickening process is carried out by the thickening part 404 in response to an output signal of the OR circuit 420, so that an output image is changed from a condition shown in FIG. 9C to a condition shown in FIG. 10A. As shown, the output image is spread only at its lower portion along a sub-scanning line, or a length of the image in a sub-scanning direction is enlarged. Then, in response to an output signal of the OR circuit 422, a main-scan thickening process is carried out so that the output image is changed from the condition shown in FIG. 10A to a condition shown in FIG. 10B. As shown, the output image is spread only at the right-hand portion along a main-scanning line, or a width of the image in a main scanning direction is enlarged. FIG. 10C shows an output image after the above spreading processes are carried out.

Figure 11A:
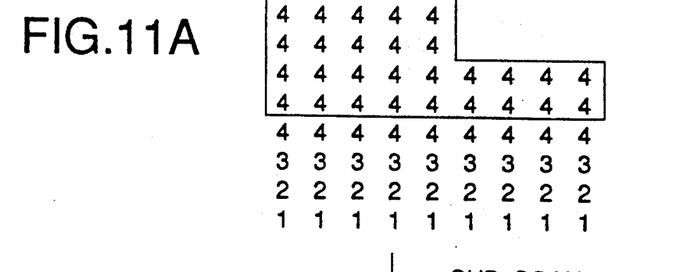
FIGS. 11A through 11C are diagrams for explaining a spreading process first performed by the thickening part.
Figure 11B:
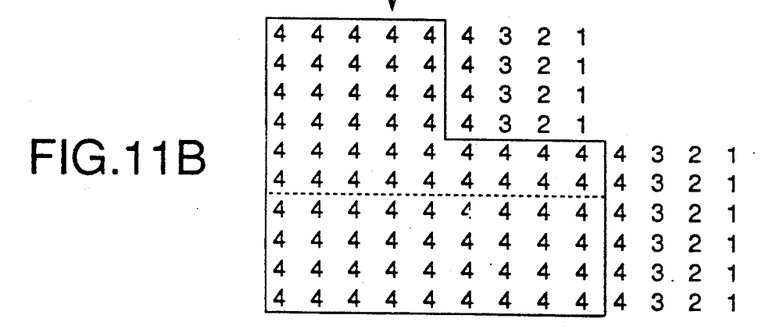
Figure 11C:
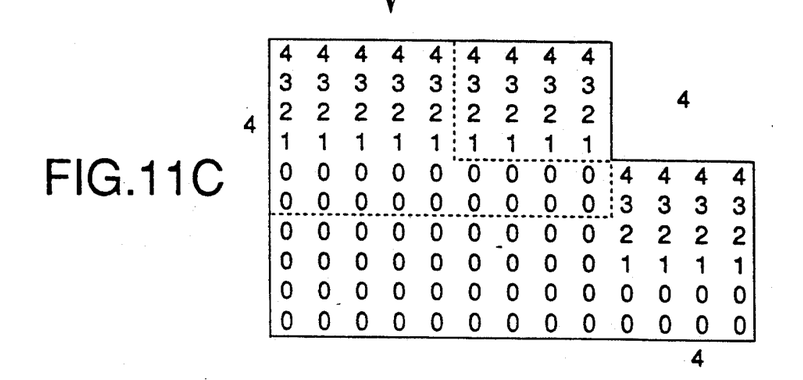
Figure 12A:
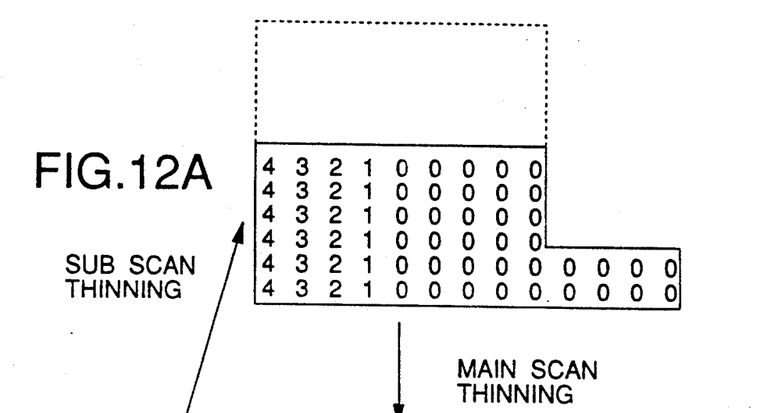
FIGS. 12A through 12C are diagrams for explaining a choking process performed by the thinning part after the spreading process is performed.
Figure 12B:
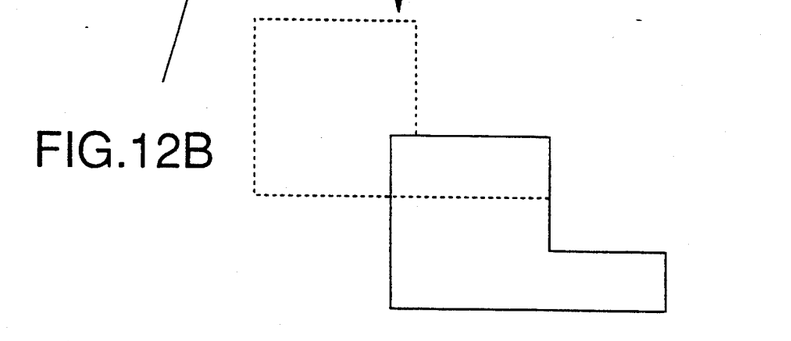
Figure 12C:
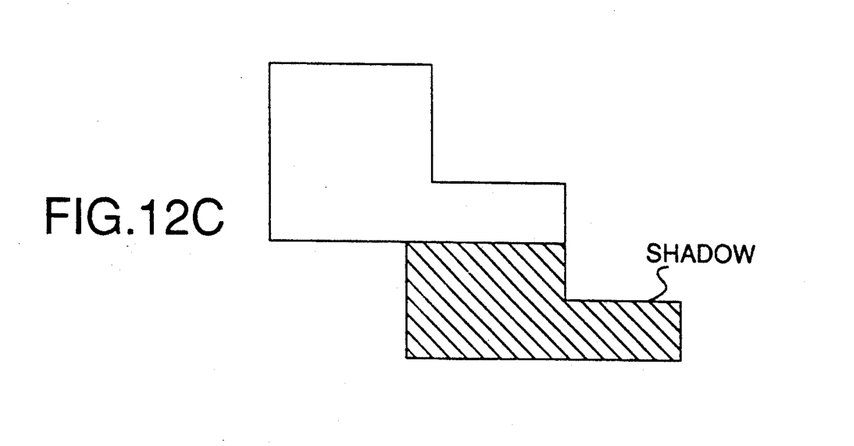

FIGS. 11A through 11C show a spreading process first performed by the thickening part 404, and FIGS. 12A through 12C show a choking (thinning) process performed after the spreading (thickening) process is performed. These processes are essentially the same as described above in conjunction with FIGS. 9A through 9C and FIGS. 10A through 10C except the sequence of the processes being carried, and a description thereof will be omitted.

As described above, if the choking process shown in FIGS. 9A through 9C and the spreading process in FIGS. 10A through 10C are carried out, it is possible to move the image to the right diagonally downward. In the choking process, the image is choked and its upper portion and its left-hand portion are removed. In the spreading process, the image is spread and its lower portion and its right-hand portion are restored.

In the above described embodiment, the choking process and the spreading process can be carried out by using a smaller storage space of the line memory than that in the conventional apparatus. Also, the irregularities in the image can be removed by carrying out the choking process and the spreading process, so that a smooth image can be formed. If the spreading process is carried out after the choking process is completed, only an image of relatively great character or logotype can be moved to the right diagonally downward as shown in FIGS. 9A through 10C without moving an image of relatively small character or logotype. Also, it is possible to prevent a shadow from being added to the image of relatively small character or logotype. If the choking process is carried out after the spreading process is completed, it is possible to move all the image data to the right diagonally downward as shown in FIGS. 11A through 12C.

In the image processing unit 22 shown in FIG. 3, a color data generating part for supplying color data to the selector 401 and the selector 401 are provided for carrying out an image composition process in which a composite image of the original image with its shadow is formed. FIGS. 10C and 12C each show such a composite image of the original image with the shadow which is formed by outputting the color data by means of the selector 401 if no binary data is supplied and the image movement data is supplied and by outputting the image data by means of the selector 401 otherwise.

In the second embodiment shown in FIG. 5, the choking process and the spreading process are carried out repeatedly by the image processing circuits 405a and 405b so that a repetitive procedure for the movement of the image is carried out. The number of the repeated movements, a thinning width and a thickening width can arbitrarily be preset, and the displacement for the repeated movements is equal to the thinning/thickening width multiplied by the repetition number. According to the second embodiment, it is possible to move the image to the right diagonally downward with necessary configuration of the original image left unchanged. Also, by repeating the movement of the image, it is possible to adjust the smoothness of the output image. In particular, when the spreading process is carried out after the choking process is completed, the size of the character or logotype image to be moved can be selected. Also, the movement of the image can be carried out by presetting, for example, a thinning width (=5) for a first choking process, a thickening width (=10) for a spreading process and a thinning width (=5) for a second choking process.

In addition, the thinning part and the thickening part in the image processing unit can easily be modified by adding an exclusive-OR circuit thereto in accordance with the structural relationship between the thinning circuit and the thickening circuit as shown in FIG. 13, so that the order of carrying out the choking process and the spreading process by means of the thinning circuit and the thickening circuit is reversed.

Figure 14:
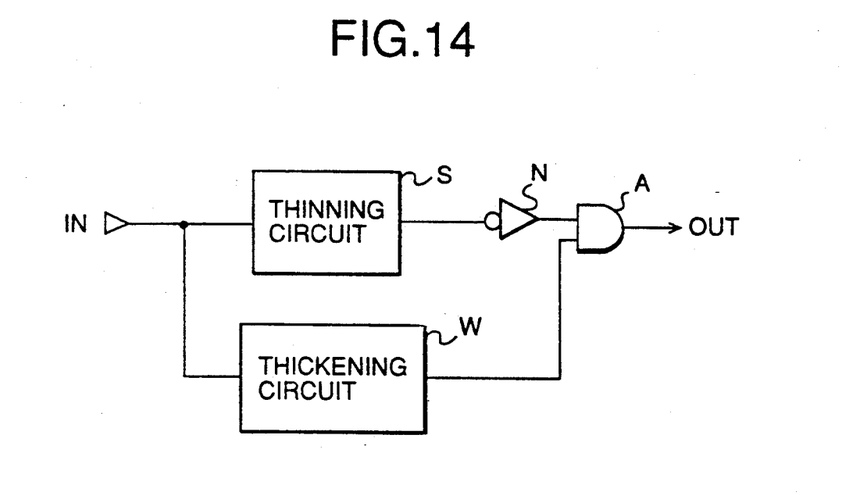
FIG. 14 is a circuit diagram showing a shadow outlining part used in the image processing apparatus of the invention.
Figure 15:
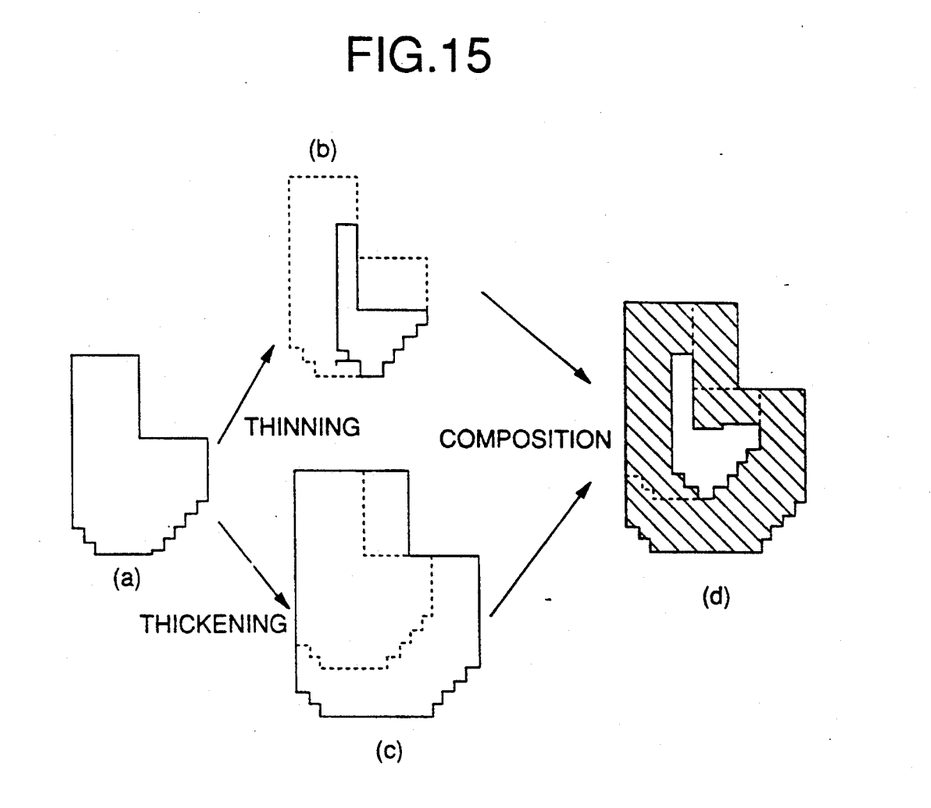
FIG. 15 is a diagram for explaining a shadow outlining process performed by the shadow outlining part of FIG. 14.

FIG. 14 shows a construction of a shadow outlining part for carrying out a shadow outlining process. In FIG. 14, a thinning circuit S and a thickening circuit W are connected in parallel in the shadow outlining part. A binary signal indicating an input image data is input to the thinning circuit S and also input to the thickening circuit W. An output signal of the thickening circuit W which signal is indicative of a spread image is supplied to an AND circuit A. An output signal of the thinning circuit S which signal is indicative of a choked image is supplied to an inverter N and the supplied signal is inverted by the inverter N so that the inverted signal is supplied to the AND circuit A. A composite image of an inverted image supplied by the thinning circuit S via the inverter N and the spread image supplied by the thickening circuit W, or a "shadow outlined" image, is thus output by the shadow outlining part. FIG. 15 shows a shadow outlining process performed in such a manner by the shadow outlining part of FIG. 14. FIG. 15(a) shows the original image to be processed, FIG. 15(b) shows a choked image formed by the thinning circuit S of FIG. 14, and FIG. 15(c) shows a spread image formed by the thickening circuit W of FIG. 14. An image composition process is carried out by means of the AND circuit A so that the composite image of the spread image and the inverted choked image, as shown in FIG. 15(d), is output by the shadow outlining part. By carrying out the shadow outlining process as mentioned above, it is possible to use a smaller storage space of the line memory, with no need for inputting binary data to the line memory prior to the shadow outlining process. The output image formed in this embodiment is a stair-like outline having a rectangular pattern and a length of a slanting line in the output image is $2^{(1)}$ times that of a vertical line or a horizontal line. However, it is possible to remarkably reduce the storage capacity of the line memory, allowing a small-sized image processing apparatus to be constructed.

Figure 16:
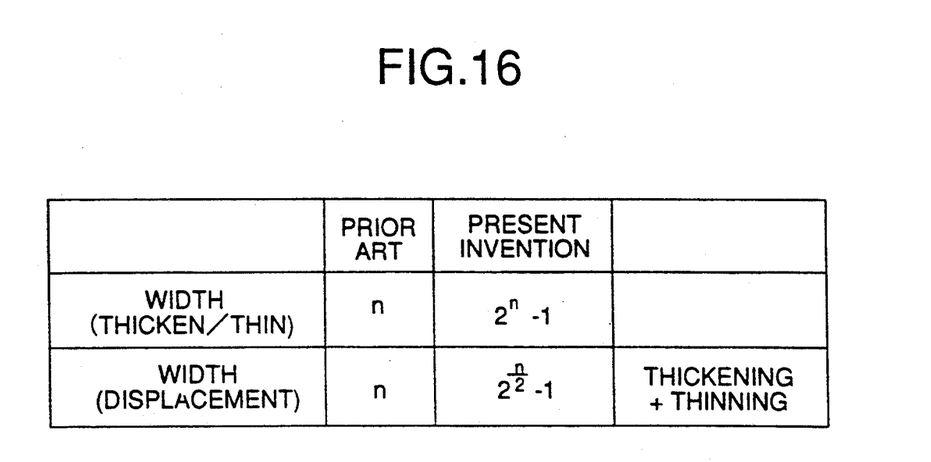
FIG. 16 is a table for explaining a difference between the prior art and the present invention.

FIG. 16 shows differences in the thinning/thickening width and in the image moving (displacement) width between the prior art apparatus and the present invention. In a table shown in FIG. 16, "n" denotes the number of lines of image data in the line memory.

As described above, according to the present invention, it is possible to efficiently use the line memory when carrying out the plane shadow process or the shadow outlining process. By means of the thinning part and the thickening part in the image processing unit of the invention, the shadow processes can be carried out by writing only necessary data to the line memory, with no need for storing plural lines of image data in the line memories during the shadow processes. Also, according to the present invention, it is possible to add a shadow to an image of relatively great character or logotype only, with no need for removing undesired matter such as dust or stain from the original image prior to the shadow process.

Further, the present invention is not limited to the above described embodiments, and variations and modifications may be made without departing from the scope of the present invention.

What is claimed is:

1. An image processing apparatus having a scanning unit reading out image data by scanning a document, an image processing unit carrying out an image processing of the image data supplied by the scanning unit, and a recording unit outputting an image supplied by the image processing unit for recording the image, said image processing unit comprising:

control means for allowing real-time operations of the scanning unit and the recording unit;

binarizing means for generating signals indicative of binary data from the image data supplied by said scanning unit;

preset data generating means for generating either a preset thinning width or a preset thickening width;

a thinning circuit for carrying out a choking process in accordance with said preset thinning width whereby the binary data supplied by the binarizing means is moved either in a main scanning direction or in a sub scanning direction and a portion of an original image is removed so a to obtain a choked image;

a thickening circuit for carrying out a spreading process in accordance with said preset thickening width whereby the supplied binary data is moved either in the main scanning direction or in the sub scanning direction and an additional image portion is added to the original image so as to obtain a spread image; and image composition means for generating a composite image of the choked image supplied by the thinning circuit and the spread image supplied by the thickening circuit so that a shadow is added to the original image.

2. An apparatus according to claim 1, wherein said thinning circuit includes a line memory, a selector for inputting selectively the preset thinning width data, supplied by the preset data generating means, to the line memory, and a counter to which data output by the line memory is supplied in accordance with the preset data and the binary data supplied by the binarizing means.

3. An apparatus according to claim 1, wherein the thickening circuit includes a line memory, a selector for inputting selectively the preset thickening width data, supplied by the preset data generating means, to the line memory, and a counter to which data output by the line memory is supplied in accordance with the preset data and the binary data supplied by the binarizing means.

4. An apparatus according to claim 1, wherein said image processing unit includes a plurality of said thinning circuits and a plurality of said thickening circuits connected in series so that the choking process and the spreading process are carried out repeatedly.

5. An apparatus according to claim 1, wherein the thinning circuit first carries out a choking process with respect to the sub scanning direction and carries out a choking process with respect to the main scanning direction, and the thickening circuit secondly carries out a spreading process with respect to the sub scanning direction and carries out a spreading process with respect to the main scanning direction.

6. An apparatus according to claim 1, wherein the thickening circuit first carries out a spreading process with respect to the sub scanning direction and carries out a spreading process with respect to the main scanning direction, and the thinning circuit secondly carries out a choking process with respect to the sub scanning direction and carries out a choking process with respect to the main scanning direction.

7. An apparatus according to claim 1, wherein said image processing unit includes a shadow outlining circuit for carrying out a shadow outlining process by carrying out the choking process by means of the thinning circuit, carrying out the spreading process by means of the thickening circuit, and generating a composite image of a choked image supplied by the thinning circuit and a spread image supplied by the thickening circuit by means of the image composition means.

8. An apparatus according to claim 7, wherein said shadow outlining circuit includes the thinning circuit and the thickening circuit connected in parallel, an inverter coupled to an output of the thinning circuit, and an AND circuit coupled to an output of the inverter and to an output of the thickening circuit.

9. An apparatus according to claim 1, wherein said thickening circuit is equivalent to the thinning circuit if an inverter is connected to an input of the thinning circuit and another inverter is connected to an output of the thinning circuit.

* * * * *